Figure 1:
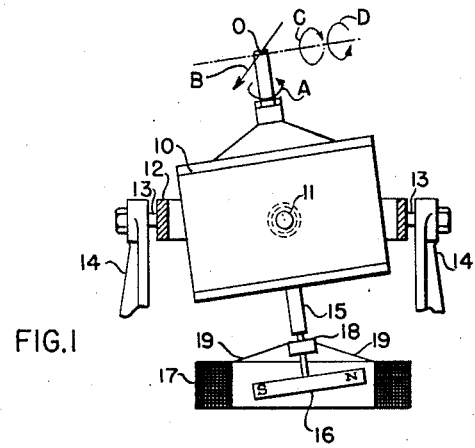

Sept. 7, 1943.                H. C. ROTERS                 2,328,744
                    ELECTROMAGNETIC GYRO-ERECTING SYSTEM
                Filed March 18, 1942              3 Sheets-Sheet 1

INVENTOR
HERBERT C. ROTERS
BY Lawrence B. Dodds
ATTORNEY

Sept. 7, 1943.  H. C. ROTERS  2,328,744
ELECTROMAGNETIC GYRO-ERECTING SYSTEM
Filed March 18, 1942  3 Sheets-Sheet 2
FIG.5B
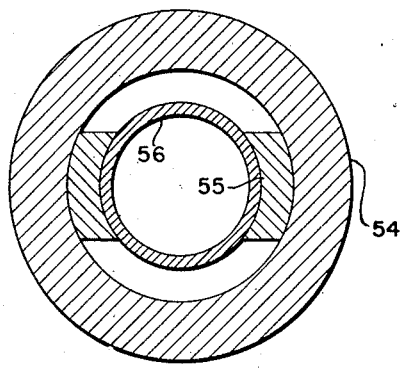
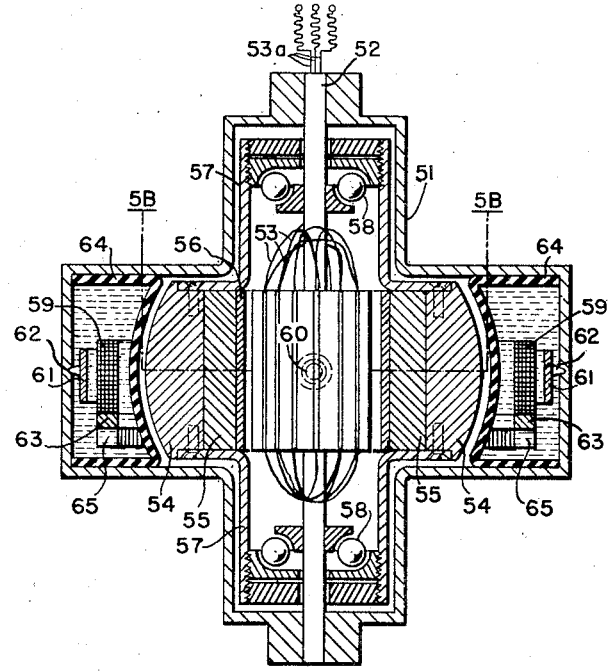
FIG.5A
INVENTOR
HERBERT C. ROTERS
BY
ATTORNEY Sept. 7, 1943.    H. C. ROTERS    2,328,744
ELECTROMAGNETIC GYRO-ERECTING SYSTEM
Filed March 18, 1942    3 Sheets-Sheet 3

INVENTOR
HERBERT C. ROTERS
BY
ATTORNEY

Patented Sept. 7, 1943

2,328,744

UNITED STATES PATENT OFFICE 2,328,744

ELECTROMAGNETIC GYRO-ERECTING SYSTEM

Herbert C. Roters, Roslyn, N. Y., assignor to Fairchild Aviation Corporation, a corporation of New York Application March 18, 1942, Serial No. 435,200

13 Claims. (Cl. 74—5)

This invention relates to electromagnetic gyro-erecting systems and, while it is of general application, it is particularly suitable for providing an artificial horizon for aerial and naval craft.

It is well known that gyroscopes used as artificial horizons or as stabilizers will gradually, due to extraneous forces, such as those due to friction, those required for control operations, and extraneous electrodynamic forces and the like, develop a precessional movement of the gyroscope so that, at any given instant, the spin-axis of the gyroscope no longer represents the true vertical. To maintain the usefulness of the gyroscope this motion of its spin-axis must, of course, be eliminated and the spin-axis maintained in the true vertical. Systems for effecting this result have been generally termed "erecting systems."

Gyro-erecting systems most commonly used heretofore have been of the pneumatic type, comprising a plurality of air jets and pendulous shutters or valves operating by gravity to regulate the jets in accordance with the tilt of spin-axis of the gyroscope from vertical, the controlled jets operating on vanes, or the like, attached to the gyroscope casing to restore its spin-axis to vertical. However, such pneumatic systems have a number of disadvantages among which may be mentioned the requirement of an auxiliary air supply if applied to electrically-driven gyroscopes; the difficulty in maintaining adequate air pressure at high altitudes when applied to aircraft; the nonlinear response characteristic of this type of system; the complex mechanical valve system required and the relative insensitivity of such a valve system to small tilts of the gyroscope and its susceptibility to freezing under certain atmospheric conditions; and the difficulty in rendering the erecting system inoperative during turns, as explained hereinafter.

There have also been proposed certain other types of gyro-erecting systems which have not found their way into commercial use because of one or more serious shortcomings. For example, there has been proposed the mechanical spinning-ball type comprising a ball-shaped armature freely floating on an air film with a pendulously-supported driving stator and a stabilized platform controlled by a follow-up system. This system has the disadvantages of requiring an additional driven member, of having a nonlinear response characteristic, and of imposing excessive weight on the gimbals of the supporting platform.

Also there have been proposed electromagnetic gyro-erecting systems in which the erecting torque is developed by the interaction of a pendulously-supported polyphase exciting winding and a nonrotating inductor supported by the gyroscope casing. While this system is sound in principle, it falls short of the desired result in that no provision is made for ensuring the optimum phase relation between the direction of tilt of the spin-axis and the direction in which the restoring force is applied, while as is well known these two directions must be in quadrature. This system has the further disadvantages that it requires a source of polyphase power which in certain installations may not be otherwise required or readily available; and that the pendulously-supported exciting winding tends, under certain conditions, to develop a violent spiralling motion which renders the system useless.

It is an object of the present invention, therefore, to provide an improved electromagnetic gyro-erecting system of simple construction which avoids one or more of the above-mentioned disadvantages of the gyro-erecting systems of the prior art.

It is another object of the invention to provide an improved electromagnetic gyro-erecting system which has a substantially linear response over the range of angles of tilt of the spin-axis usually encountered and which continuously maintains the optimum phase relation between the direction of the restoring force and the direction of tilt of the spin-axis under all operating conditions.

It is another object of the invention to provide an improved electromagnetic gyro-erecting system including reacting inductor and exciting elements, one of which is pendulously supported, in which the spiralling tendency of the pendulously-supported element is reduced or avoided.

In accordance with the invention there is provided an electromagnetic gyro-erecting system comprising a gyroscope having a rotor normally rotatable about a vertical axis, an inductor element, and an element for producing a magnetic field. These elements are relatively disposed so that the field of the magnetic element links the inductor element to an extent dependent upon the tilt of the axis of the rotor from the vertical. One of the elements is nonrotatable about the axis of the rotor and is pendulously and universally supported with respect to the gyroscope. The system also includes means for supporting and rotating the other of the elements about the axis of the rotor in the same direction as and at a speed related to and controlled by the rotor. The support of the elements is such that the magnetic torque developed between the elements upon the tilt of the rotor axis is applied to the rotor as a precession torque in a plane substantially normal to the vertical plane including the tilted rotor axis to restore the axis to the vertical. As used in this specification and in the appended claims, the term "gyroscope" is intended to refer only to the minimum conventional elements essential for procuring gyroscopic action; specifically, a rotor, a universal support for the rotor, such as a pair of gimbal rings, and of which a driving means, such as a driving motor, may or may not form an integral part.

For a better understanding of the present invention together with further and other objects thereof, reference is had to the following description taken in connection with the accompanying drawings and its scope will be pointed out in the appended claims.

Figure 2:
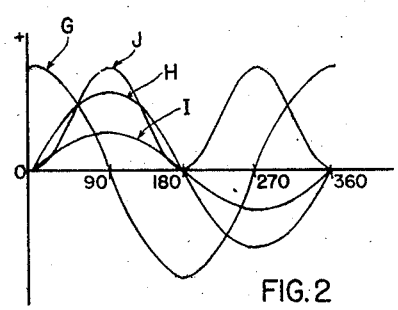
Figure 3:
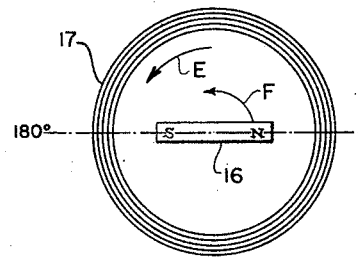
Figure 4:
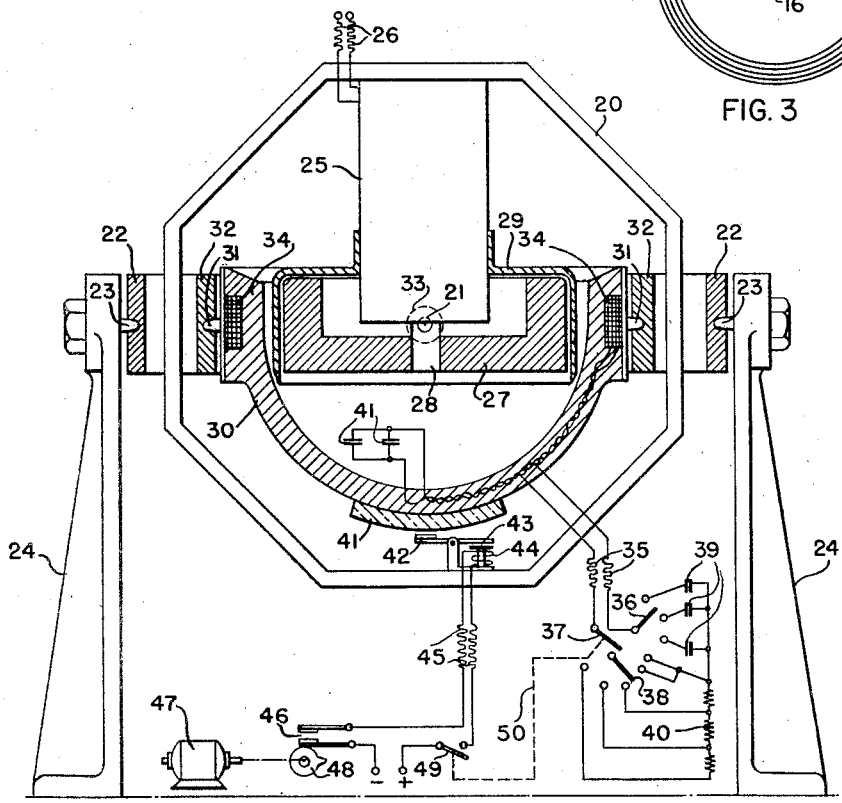

Referring to the drawings, Fig. 1 is a schematic view, in elevation, of an improved electromagnetic gyro-erecting system embodying the present invention; Figs. 2 and 3 are graphs used to explain the operation of the system of Fig. 1; Fig. 4 is an elevation, partly in section, of a preferred construction of the electromagnetic gyro-erecting system illustrated in Fig. 1; while Fig. 5A is a longitudinal sectional view of a modified form of the electromagnetic gyro-erecting system in which the rotating magnetic member serves the dual function of a motor field and an exciting member for the auxiliary inductor used to develop the restoring force; and Fig. 5B is a cross-sectional view of the rotor structure of the system of Fig. 5A, taken along the line 5B—5B; while Figs. 6–9, inclusive, are graphs of certain operating characteristics of the erecting system of the invention.

Referring now to Fig. 1 of the drawings, there is shown, in schematic form, an improved electromagnetic gyro-erecting system embodying the invention in its simplest form for the purposes of explanation. In this figure the gyroscope comprises a casing 10 universally supported from an aircraft or other vehicle by means of gimbals comprising pivots 11 engaging a gimbal ring 12 which, in turn, is supported by means of pivots 13 from suitable standards 14. It will be understood that the gyroscope casing 10 includes a conventional gyroscope rotor normally rotatable about a vertical axis and driven by any suitable motor, such as an electric motor or a pneumatic motor. There is provided an element for producing a magnetic field, such as a two-pole permanent magnet 16 having poles N, S, as indicated, and means for supporting and rotating the magnetic field-producing element about the axis of the rotor in the same direction as, and at a speed related to and controlled by the rotor; for example, such supporting means may comprise an extension 15 of the motor shaft on which the magnet 16 is mounted with the mean plane of the magnet 16 normal to the rotor axis. An inductor element such as a closed-circuit annular coil 17 is pendulously and universally supported with respect to the gyroscope from the shaft 15 by a collar 18 or the like and cables 19, 19, so that the inductor 17 is nonrotatable with the shaft 15 but moves therewith as the spin-axis of the gyroscope tilts about the vertical. The coil 17 surrounds the magnet 16 and these two elements are relatively disposed so that normally there is no flux linkage between these two elements but, on tilt of the rotor axis, the field of the magnet 16 links the coil 17 to an extent dependent on the tilt of the rotor axis from the vertical. It will be understood, of course, that the gyroscope system as a whole is statically balanced about both gimbal axes and that this balance is not disturbed by the movement of the inductor 17 during tilting of the gyroscope, since its weight always is supported from a given point of the shaft 15 through the cables 19 and collar 18.

Neglecting the effect of the magnet 16 and the inductor 17, it will be seen that the gyroscope described is purely conventional and will operate in a conventional manner. However, even if the spin-axis of the gyroscope is initially set in the vertical, extraneous forces tend to develop a precessional movement of the gyroscope which gradually increases. These extraneous forces may be the result of friction, centripetal acceleration during turns of the vehicle carrying the gyroscope, reaction forces from apparatus controlled by the gyroscope, and the like.

Considering now the operation of the magnetic field-producing element 16 and the inductor 17, it will be assumed that these elements are so disposed that, when the axis of the rotor is vertical, the mean plane of the inductor 17 coincides with the mean plane of the magnetic field of element 16 so that none of the magnetic flux of the element 16 links the inductor 17 and there is no magnetic coupling between these elements. However, when the gyroscope tilts, as in the position illustrated, the amount of flux linkage between the element 16 and the inductor 17 varies from maximum in the position illustrated to zero when the magnet 16 has rotated through 90 degrees and to a maximum with opposite polarity when the magnet 16 has rotated through 180 degrees. Therefore, as the magnet rotates it generates a sinusoidal electromotive force in the inductor 17 and, since this element is short-circuited, produces a circulating current therein. The magnetic field produced by the circulating current in inductor 17 reacts with that of the magnet 16 producing a magnetic couple which, under the conditions illustrated, tilt the inductor 17 about its diameter lying in the plane of the paper. This tilting of the inductor 17 produces an equal and opposite torque on the magnet 16 which is rigidly attached to the shaft 15 of the gyroscope rotor. That is, the support of the magnet 16 and the coil 17 is such that the magnetic torque developed between these elements upon tilt of the rotor axis is applied to the rotor as a precession torque. It will be seen that this torque is in a plane including the rotor axis and normal to the plane of the paper and is thus also normal to the vertical plane including the tilted rotor axis. In other words, the restoring couple acting on the gyroscope rotor through the magnet 16 is in a plane in quadrature to the direction of tilt, which is the required relationship for restoring the spin-axis of the gyroscope to the vertical. These relations are indicated by the arrows and vectors of Fig. 1, in which the arrow A represents the direction of rotation of the gyroscope rotor, the vector B the required erecting force, the arrow C the torque on the inductor 17 due to the magnetic reaction between its field and that of the magnet 16, and the arrow D the equal and opposite reaction torque on the magnet 16 which, it is seen, is correct for producing the erecting force B at the point O.

These relations may be seen more clearly by reference to Figs. 2 and 3 of the drawings, Fig. 3 representing, in schematic form, the inductor 17 and the magnet 16. The induced current in the inductor 17 is indicated by the arrow E and the direction of rotation of the magnet 16 by the arrow F. The variation of flux linkage between the inductor 17 and the magnet 16 with the rotation of the rotor is indicated by curve G of Fig. 2. This flux linkage induces in inductor 17 a voltage represented by curve H which lags the flux linkage by 90 degrees. Assuming that the inductor 17 is primarily resistive, the circulating current therein is in phase with the induced voltage and is represented by the curve I, which also represents the magnetic field set up by the current in the inductor 17. This magnetic field reacting with the field of the magnet 16 produces a reaction couple represented by the curve J which, it will be seen, is a double-frequency quantity with maximum values in the plane normal to the vertical plane including the tilted rotor axis. That is, the flux linkage is a maximum when the elements are in relative positions shown in Fig. 1 and 180 degrees from those positions, while the magnetic couple is a maximum when the elements are relatively displaced 90 degrees from these positions, which is the correct phase relation for restoring the axis of the gyroscope to the vertical.

A preferred actual construction of the improved electromagnetic gyro-erecting system of the invention is shown, partly in cross section, in Fig. 4, in which the gyroscope casing 20 is universally supported by means of gimbals comprising pivots 21 engaging a gimbal ring 22 which, in turn, is supported by means of pivots 23 from suitable standards 24. Disposed within the casing 20 is a motor 25 of any suitable type with connections brought out through flexible leads 26. The magnetic field-producing element is in the form of a disc 27 mounted on an extension 28 of the motor shaft, the disc 27 being made of permanent magnetic material and being magnetized along its diameter to form a two-pole magnet. Surrounding the element 27 and supported from the casing of motor 25 is a wind screen 29, preferably of non-conductive material such as a thermo-plastic resin, or of conductive material of high specific electrical resistance. If desired, the wind screen may be extended to cover the bottom of the magnetic disc 27. Surrounding the disc 27 is a hemispherical cradle 30 universally supported from the gyroscope casing by means of gimbals comprising pivots 31 supported from a second gimbal ring 32 which, in turn, is supported from the gyroscope casing 20 by means of pivots 33. Preferably the gimbal support for the gyroscope and the gimbal support for the cradle have their corresponding pivotal axes in the same plane when the gyroscope is in the vertical position, the axes of each support being mutually perpendicular, and the axes of all supports intersecting at a common point. The hemispherical cradle 30 is also preferably of nonconductive material, such as a thermo-plastic resin, or if of a conductive material is made thin and of material having a high specific resistance.

In the structure of Fig. 4, the erecting coil is in the form of a winding 34 mounted in an annular recess in the periphery of the cradle 30 and surrounding the field-producing magnetic disc 27. The wind screen 29 is effective to eliminate frictional drag on the cradle 30 by the high-speed rotating disc 27. The circuit of the winding 34 is brought out through a pair of leads 35. The leads 35 are brought out to a pair of switches 36 and 37, the latter of which co-operates with a switch 38, the switches 36 and 38 serving to include in the circuit of the winding 34 selected ones of the condensers 39 and selected portions of a tapped resistor 40. Permanently included in the circuit of the winding 34 are one or more condensers 41 disposed within the cradle 30 and so proportioned as normally to tune the winding 34 approximately to resonance.

There is attached to the bottom of the cradle 30 a weight 41 to increase the pendulosity of the cradle 30. In order to minimize the spiralling motion of the cradle described hereinafter, there is provided suitable means for damping the movement of the pendulously-supported cradle 30 such as an electromagnetic brake co-operating with the spherical surface of the weight 41 and comprising a brake pad 42 mounted on an armature 43 co-operating with an electromagnet 44, the circuit of which is brought out through the gyroscope casing by means of flexible leads 45. The circuit of the electromagnet 44 also includes an interrupter 46 driven by a motor 47 and cam 48. The circuit of electromagnet 44 also includes a suitable source of direct current, as indicated, and a switch 49 connected for unicontrol with the switch 37, as indicated by the dashed line 50. It will be understood that the flexible leads 26, 35 and 45 should have sufficient flexibility so as not to impede appreciably the free universal movement of the gyroscope casing 20 and the cradle 30. It will also be understood that the clearances of the several elements are such as to permit a substantial angular deflection of the gyroscope casing 20 with respect to the standards 24 and of the cradle 30 with respect to the gyroscope casing 20. Preferably an angular movement of the order of 50 to 70 degrees should be provided for.

The operation of the structure shown in Fig. 4 is essentially that described above in connection with Fig. 1 plus certain additional refinements. It will be noted that, in this structure, the erection torque is developed directly between the gyroscope rotor 27 and the pendulously-supported erecting coil 34 by the magnetic couple between these elements so that the erecting torque is supplied to the gyroscope rotor without the interposition of any mechanical links or elements.

As indicated in Figs. 2 and 3 and as analyzed hereinafter, there exists a direct relation between the phase angle of the impedance of the erector circuit, that is, the power factor of the circuit, and the phase angle of the plane in which the erection torque is applied. In general, the simple primary relationship, explained above, corresponding to a quadrature space relation between the plane of the tilt axis and the plane of the erection couple is modified by a secondary reaction. This secondary reaction consists of an additional electromagnetic torque produced in the plane of the tilt axis due to the primary motion of the erector coil in the quadrature plane. This secondary reaction is such as to decrease the effective angle of tilt between the axis of spin and the axis of the erector coil. This undesirable secondary reaction on the effective angle of tilt of the spin-axis can be controlled by the power factor of the erector coil. Thus when the erector coil circuit is at resonance the primary torque reaction is in quadrature with the axis of tilt; when its impedance is inductive, that is, has a positive reactance, the primary torque reaction occurs at an angle larger than quadrature (2nd quadrant of Fig. 3); when its impedance is capacitive, that is, has a negative reactance, the primary torque reaction occurs at an angle less than quadrature (1st quadrant of Fig. 3). It is, therefore, obvious that the undesired secondary reaction can be eliminated by making the phase angle of the erector-circuit impedance negative, which produces a primary torque component in the plane of tilt in the opposite direction to the undesirable secondary reaction.

For the purpose of controlling the phase angle of the reactance of the erector circuit, there are provided the fixed condensers 41 which tune this circuit on the capacitive side of resonance. In order to provide more precise adjustment of the phase angle of the erector-circuit impedance, there are provided the auxiliary condensers 39 and tapped resistor 40, various portions of which can be selectively included in circuit with coil 34 by the switches 36, 37 and 38 to control not only the phase angle of the erector-circuit impedance, but also the resistance of this circuit. By this means the phase angle of the erector circuit as well as its Q can readily be adjusted for optimum conditions.

Experimental and mathematical analyses have shown that, in addition to the desired erecting couple, there is produced in the erecting coil a spurious torque which increases exponentially with time and the plane of action of which rotates around the vertical in the direction of rotor spin at an angular speed determined by the constants of the erector circuit and the mechanical constants of the erector system. This torque causes the erecting coil and its pendulously-supported cradle 30 to act as a conical pendulum with progressively increasing amplitude of swing. It can also be shown that the tendency of the pendulously-supported element 30 to spiral depends upon the tuning of the erector circuit; if the erector circuit is capacitively reactive the spiralling tendency is decreased, while if it is inductively reactive the spiralling effect is increased. However, tuning the erector circuit capacitively substantially from resonance is not always a complete solution since it has been found that, under such conditions, the magnitude of the desired erecting torque decreases to a value which may be undesirably small unless the compliance of the system is large. It is to be noted that this spiralling motion of the pendulously-supported cradle 30 is unrelated to the motion of the gyroscope casing itself.

This spiralling motion of the erector system is eliminated in the structure described by means of the brake pad 42 co-operating with the frictional surface of the weight 41. Upon energization of the circuit of the electromagnet 44 by the interrupter 46, the pad 42 engages the weight 41, momentarily holding the cradle 30. In order, however, that the erector system will hang free in the gravitational field so that its average position will indicate the true vertical, the frictional damping must be periodically removed. This is effected by the periodic interruption of the circuit of the electromagnet 44 by the interrupter 46, which releases the brake pad 42 and permits the erector system to swing freely, assuming an average position with the mean plane of coil 34 horizontal. With such a system, therefore, the gyroscope rotor reaches a condition of equilibrium in which its axis is normal to the mean plane of the erector coil.

In normal operation when the mobile vehicle on which the gyroscope is mounted is moving in a straight course, the erector system swings freely, slightly retarded by the brake system 41, 42, due to accelerations such as those produced by rolling and pitching. These swings have a period determined by the length of the pendulum of the erector system, which is relatively short. The gyroscope, on the other hand, due to its great effective mass produced by rotation of the rotor, has a very long period of swing and is but little affected by these accelerations. Therefore, the average effect produced by the swinging of the erector system is zero and the erector coil holds the axis of the gyroscope normal to its average plane, which is horizontal.

However, when the airplane or ship executes a curve, the centripetal acceleration so produced persists for the duration of the curve and so tends to cause the erector system to align itself with the effective field produced by the effective resultant of the earth's gravitational field and that due to the centripetal acceleration. The gyroscope casing, etc., would normally tend to remain in the true vertical because it is adjusted to be nonpendulous about its gimbals but, due to the erector coil having assumed a false vertical during the curve, it would be forced to follow at a rate determined by the erection system. This would cause the indication of the gyroscope to be false when the airplane is turning, especially if the turn is sustained for a long time. In a somewhat similar manner the frictional coupling between the erector system and the gyroscope casing produced by magnet 27 tends to drag the gyroscope casing off the true vertical during a turn. Hence, it is desirable to disconnect the erector system and the damping magnet during a turn. This is accomplished in the structure described by means of the mechanically interconnected switches 37 and 49 which may be operated when a turn is made simultaneously to release the brake pad 42 and to open the circuit of the erector coil 34 to render the erecting system completely inoperative for the duration of the turn.

The relations between the essential parameters of the system may best be explained by reference to the following equations which have been derived from fundamental principles. These equations have been based on the assumption that the circuit constants of the erector circuit are adjusted so that the resultant torque is in a plane normal to the vertical plane including the tilt-axis of the gyroscope and are limited to relatively small angles of tilt, of the order of a few degrees, which are seldom exceeded in practice.

The magnitude of the erecting torque $D_e$ developed by the system described is given by the following equation:

$$De = \frac{\omega K^2}{2R}\theta_0 \text{ joules per radian}$$

where $\omega$=the angular velocity of spin of the gyroscope rotor in radians per second;

$K$=the magnetic constant of the erector magnet and coil, which is determined by the flux of the magnet, the turns of the erector coil, and the geometrical configuration of the magnet and the erector coil;

$R$=the effective resistance of the erector circuit in ohms, including the direct-current resistance of the coil, added resistance due to losses, and any external resistance that may be added;

$\theta_0$=the angular tilt of the spin-axis of the rotor from the vertical, in radians.

From this equation it is seen that the erecting torque is proportional to the angle of tilt of the gyroscope axis and that the magnitude of this torque is independent of the phase angle of the impedance of the erecting coil circuit for the condition of right-angle erection torque.

The tangent of the phase angle $\phi$ of the impedance of the erector coil circuit required to produce the right-angle erection torque described above is:

$$\tan \phi = -\frac{C\omega K^2}{2R} \qquad (2)$$

where $\phi$ is negative for erector circuits of capacitive reactance;
 $C=$ the compliance of the erector pendulum in radians per (joule per radian).

From this equation it is seen that the erector coil circuit must have a capacitive reactance in order to give an exact right-angle erection torque. For an erector circuit having a constant resistance which is large compared to its reactance (low Q) the reactance required for right-angle erection varies directly with the compliance of the erector. Thus, for an erector having great pendulosity the power factor is near unity, whereas for an erector of small pendulosity the power factor is low.

The damping constant $r$ in (joules per radian) per (radian per second) necessary just to prevent spiral oscillation of the pendulously-supported erector system is:

$$r = -\left(\frac{I}{C}\right)^{1/2} \sin \phi \qquad (3)$$

$$= \left[\frac{\frac{I}{C}}{1 + \left[\frac{2R}{C\omega K^2}\right]^2}\right]^{1/2} \qquad (3a)$$

where $I=$ the moment of inertia of the erector system about its gimbals in joules seconds$^2$.

Figure 6:
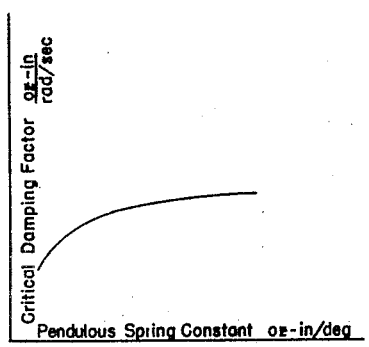

From this equation it can be seen that, for the condition of right-angle erection, the damping constant is always positive, because $\sin \phi$ is negative for a capacitive circuit. The amount of damping required is determined almost entirely by the mechanical constants of the erector system and varies directly with the square root of the moment of inertia of the erector system and inversely with the square root of the erector compliance. Hence, to reduce the required damping, the erector system should be made very light and its pendulosity small. This is illustrated in Fig. 6 which is a graph of actual experimental data on a model erector system. This data shows that the required damping, over that naturally obtained due to friction on the gimbals, etc., decreases as the pendulosity is decreased. The moment of inertia also decreases slightly with the decrease in pendulum weight.

The motion $\theta$ of the erector system in the direction normal to the vertical plane including the tilt axis per unit of tilt of the spin-axis of the rotor is given by the equation:

$$\theta = D_e C \qquad (4)$$

Figure 9:
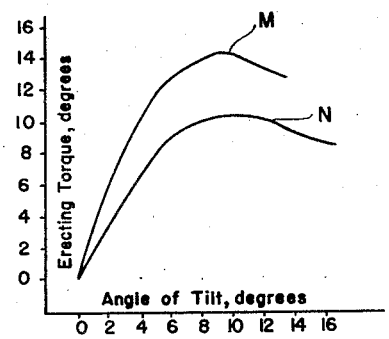

Thus the erection angle can be made relatively large compared to the tilt angle by making the compliance of the erector system large, that is, by making its pendulosity small. This is sometimes advantageous when it is desired to limit the maximum erecting torque. When the erection angle is large the erector coil may move entirely out of the field of the magnet causing the erecting torque to fall away from the linear relationship of Equation 1. These relations are shown by the curves of Fig. 9 which show the relation between angle of tilt of the erector coil and the angle of tilt of the spin-axis for two different erecting systems and are plotted from test data. Curve M represents the characteristics for a system of relatively small pendulosity and relatively low power factor while curve N represents the characteristic of a system having a somewhat higher pendulosity and power factor. The linear relationship between erecting torque or tilt angle persists to about 4 degrees of tilt, after which the erection increases less rapidly, reaching a maximum at about 10 degrees tilt. For larger angles of tilt the erection torque decreases. This deviation from the linear relationship for large angles, commonly referred to as "spoiling," is caused by the coil moving out of the field of the magnet.

It can also be seen from Equation 2 that, if the compliance of the erecting system is made large, the phase angle of the impedance of the erector circuit for right-angle erection is large, that is, its power factor is low and the erector circuit is far from resonance. This is a desirable condition as it causes the phase angle of the impedance of the erector circuit to change less with changes in frequency than if it were tuned near resonance. The result is that the right-angle erection relationship is less sensitive to frequency variation than if the circuit were operated near resonance. It is likewise obvious that a high resistance (low Q) is desirable in the erector circuit as this also reduces changes in the phase angle of the circuit impedance with changes in frequency.

Figure 7:
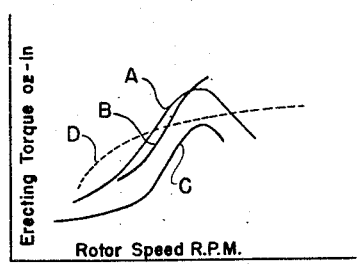

Since the frequency of the current in the erector circuit is determined by the speed of the gyroscope rotor, the above conditions make the characteristics of the erector system less sensitive to changes in rotor speed. This is shown in Fig. 7 which shows, for a rotor axis tilt of 1 degree, measured normal right-angle erection torques as a function of gyroscope rotor speed for a heavy pendulum with a high-Q erector circuit, curve A; for a medium-weight pendulum high-Q circuit, curve B; for a light pendulum high-Q erector circuit, curve C; and for a light pendulum low-Q high-resistance circuit, curve D, the ordinates of this latter curve being multiplied by 10 for the sake of clarity. While the magnitude of the erecting torque of the light pendulum low-Q circuit is considerably less, it has been found that ample erecting torque can be procured by this type of circuit and that the variations of torque with rotor speed are very small.

Figure 8:
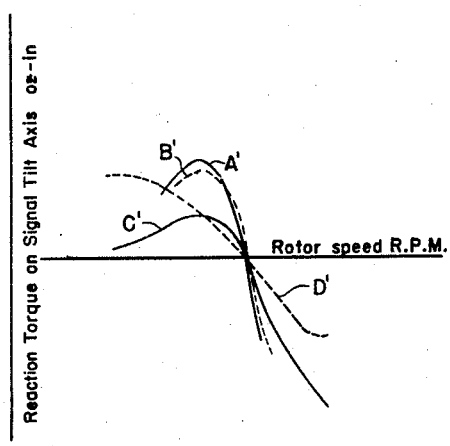

Fig. 8 represents, for the same system and same conditions over the same speed range, the undesired torque in the plane of the rotor tilt-axis. In this figure, curves similarly lettered and primed represent the same erector circuit parameters. Curve D' is multiplied by 5 for the sake of clarity. By relating the curves of Fig. 8 and Fig. 7, it can be shown that the ratio of the variation of the desired erection torque to the spurious erection torque at right angles thereto very considerably favors the light pendulum low-Q erector system.

It has also been determined that, with each of the erector systems represented in Figs. 7 and 8, the desired erecting torque for small angles of tilt is directly proportional to the tilt angle, as represented by Fig. 9, and for any given system is independent of the pendulosity of the erector system and the required capacitance of the erector circuit necessary to procure the desired right-angle erection as represented by Equation 1. This is indicated by the near coincidence of curves A and B of Fig. 7 near the central portions of the curves corresponding to the usual operating range. Curve C, which deviates considerably from curves A and B, apparently represents a system which has started to spoil due to its small pendulosity.

There are shown in Figs. 5A and 5B a modification of the structure of Fig. 4, in which the field-producing element of the erection system forms with a stationary armature member the driving motor for the gyroscope. While many well-known types of motor may be utilized, in this construction there is shown a particularly suitable synchronous motor of the hysteresis starting, variable-permeance running type, as disclosed and claimed in applicant's copending application Serial No. 390,051, filed April 24, 1941. In this construction the gyroscope casing 51, the gimbal supports of which are omitted for the sake of clarity, is supported on a hollow shaft 52 of the armature member 53, preferably of the distributed winding type, which is nonrotatable about the axis of the gyroscope rotor and is energized through flexible leads 53a extending through the hollow shaft 52. Also supported from the motor shaft 52 is the gyroscope rotor comprising a composite structure, as shown in Fig. 5B, made up of an outer annular ring 54 of high-strength permanent-magnet steel, a salient two-pole spider 55 of high-permeability low hysteresis material, such as soft iron, and an inner annular ring 56 of high hysteresis material, such as an aluminum-nickel-cobalt alloy commercially available as "Alnico." The gyroscope rotor structure is supported from the motor shaft by means of cup-shaped supporting elements 57 housing ball bearings 58 rotating on the motor shaft.

Within the gyroscope casing 51 and surrounding the rotor structure is the erector winding 59 universally supported from the casing 51 through gimbal supports including pivots 60 supported from the gimbal ring 61, which, in turn, is supported on the pivots 62 from the casing 51. Attached to the bottom of the erector coil 59 is an annular lead weight 63 to give the erector system a pendulous characteristic. The erector coil 59 is included within an annular casing 64 of nonconductive material or of material of high specific resistance which, with the outer walls of the gyroscope casing 51, forms a closed chamber which is filled with oil or other suitable damping fluid. The pendulum ring 63 is preferably provided with vanes 65 which increase the damping action of the oil bath on the motion of the erector system.

The operation of the electromagnetic erector system of Figs. 5A and 5B is essentially similar to that of Fig. 4. In this case the field-producing element of the armature system comprises also the gyroscope rotor weight as well as the field-producing element of the gyroscope, so that the total weight of the structure for a given gyroscopic effect is very considerably reduced. This reduction in weight is of advantage not only in itself, but in that it reduces the weight on the gimbal pivots and thus the friction in the universal supports, which increases the sensitivity of the system.

The operation of the modified structure of the motor rotor is described in detail in the aforementioned copending application. In brief, the "Alnico" cylinder 56 forms the rotor of a conventional self-starting hysteresis motor which normally will accelerate to synchronism and run synchronously. At the same time, the variable permeance of the rotor structure, which is a maximum along the axis of poles 55, tends to lock the rotor structure in synchronism and very materially increase the synchronous torque. The outer shell 54 is permanently magnetized along the diameter including the axis of the poles 55 to serve as the field-producing element of the erector system, which operates in the manner described above. It is clear that, in this modification of the invention, the damping due to the fluid bath in which the erector coil is mounted is applied continuously.

In general, in the improved electromagnetic gyroscope erecting systems described above, the following features have been found to be particularly desirable:

(a) The rotating system including the motor rotor should be as nearly perfectly balanced as possible both statically and dynamically;

(b) The friction of the gimbal pivots should be reduced to the minimum possible;

(c) The external leads of the electrical circuits should be made as flexible as possible and arranged to exert as little restraining torque as possible;

(d) All of the gimbal pivots should be in the same plane when the gyroscope casing and the erection coil are in exact vertical and the gimbal axes of the supports for each of these elements should be exactly mutually perpendicular;

(e) The gyroscope casing and all its associated elements should be statically balanced about its gimbals so that when the rotor is not in motion it will remain in any position to which it is adjusted;

(f) The motor should preferably be a constant speed or governed motor;

(g) The main casing, the wind screen if utilized, the gimbal rings, and the support for the erector coil should be made in such a manner as to minimize eddy currents induced by the rotating field-producing element of the erecting system; for example, these elements may be made of a thermo-plastic resin or of a material of high specific resistance.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electromagnetic gyro-erecting system comprising a gyroscope having a rotor normally rotatable about a vertical axis, an inductor element, an element for producing a magnetic field, said elements being relatively disposed so that said field links said inductor element to an extent dependent upon the tilt of the axis of said rotor from the vertical, one of said elements being nonrotatable about the axis of said rotor and pendulously and universally supported with respect to said gyroscope, and means for supporting and rotating the other of said elements about the axis of said rotor in the same direction as and at a speed related to and controlled by said rotor, the support of said elements being such that the magnetic torque developed between said elements upon the tilt of said rotor axis is applied to said rotor as a precession torque in a plane substantially normal to the vertical plane including the tilted rotor axis to restore the axis to the vertical.

2. An electromagnetic gyro-erecting system comprising a gyroscope having a rotor normally rotatable about a vertical axis, an inductor element, an element for producing a magnetic field, said elements being relatively disposed so that said field links said inductor element to an extent dependent upon the tilt of the axis of said rotor from the vertical, one of said elements being non-rotatable about the axis of said rotor and pendulously and universally supported with respect to said gyroscope, the other of said elements being mounted on said rotor, whereby the magnetic torque developed between said elements upon the tilt of said rotor axis is applied directly from said pendulously-supported element to said rotor as a precession torque in a plane substantially normal to the vertical plane including the tilted rotor axis to restore the axis to the vertical.

3. An electromagnetic gyro-erecting system comprising a gyroscope having a rotor normally rotatable about a vertical axis, an inductor element, an element for producing a magnetic field, said elements being relatively disposed so that said field links said inductor element to an extent dependent upon the tilt of the axis of said rotor from the vertical, said inductor element being nonrotatable about the axis of said rotor and pendulously and universally supported with respect to said gyroscope, said field-producing element being mounted on said rotor, whereby the magnetic torque developed between said elements upon the tilt of said rotor axis is applied to said rotor as a precession torque in a plane substantially normal to the vertical plane including the tilted rotor axis to restore the axis to the vertical.

4. An electromagnetic gyro-erecting system comprising a gyroscope having a rotor normally rotatable about a vertical axis, an inductor element comprising a closed-circuit annular coil, a magnetic field element comprising a two-pole permanent magnet, said elements being relatively disposed so that the field of said magnet links said inductor element to an extent dependent upon the tilt of the axis of said rotor from the vertical, one of said elements being nonrotatable about the axis of said rotor and pendulously and universally supported with respect to said gyroscope, and means for supporting and rotating the other of said elements about the axis of said rotor in the same direction as and at a speed related to and controlled by said rotor, the support of said elements being such that the magnetic torque developed between said elements upon the tilt of said rotor axis is applied to said rotor as a precession torque in a plane substantially normal to the vertical plane including the tilted rotor axis to restore the axis to the vertical.

5. An electromagnetic gyro-erecting system comprising a gyroscope having a rotor normally rotatable about a vertical axis, an element for producing a magnetic field comprising a disc magnetized along its diameter and mounted on the end of the rotor shaft, a hemispherical cradle nonrotatable about the axis of said rotor and pendulously and universally supported with respect to said gyroscope, an inductor supported by said cradle and surrounding said field-producing disc, whereby the magnetic torque developed between said elements upon the tilt of said rotor axis is applied to said rotor as a precession torque in a plane substantially normal to the vertical plane including the tilted rotor axis to restore the axis to the vertical.

6. An electromagnetic gyro-erecting system comprising a gyroscope having a rotor normally rotatable about a vertical axis and a gimbal support, an element for producing a magnetic field comprising a disc magnetized along its diameter and mounted on the end of the rotor shaft, a hemispherical cradle nonrotatable about the axis of said rotor, an inductor supported by said cradle and surrounding said field-producing disc, a gimbal support for said cradle, the pivotal axes of said gimbal supports being located in the same plane, whereby the magnetic torque developed between said elements upon the tilt of said rotor axis is applied to said rotor as a precession torque in a plane substantially normal to the vertical plane including the tilted rotor axis to restore the axis to the vertical.

7. An electromagnetic gyro-erecting system comprising a gyroscope having a rotor normally rotatable about a vertical axis, an inductor element comprising a closed-circuit annular coil, a magnetic field element comprising a two-pole permanent magnet, said elements being disposed with the mean plane of the coil coincident with the mean plane of the rotating field when the axis of said coil is vertical so that the field of said magnet links said inductor element to an extent dependent upon the tilt of the axis of said rotor from the vertical, one of said elements being nonrotatable about the axis of said rotor and pendulously and universally supported with respect to said gyroscope, and means for supporting and rotating the other of said elements about the axis of said rotor in the same direction as and at a speed related to and controlled by said rotor, the support of said elements being such that the magnetic torque developed between said elements upon the tilt of said rotor axis is applied to said rotor as a precession torque in a plane substantially normal to the vertical plane including the tilted rotor axis to restore the axis to the vertical.

8. An electromagnetic gyro-erecting system comprising a gyroscope having a rotor normally rotatable about a vertical axis, an inductor element, an element for producing a magnetic field, said elements being relatively disposed so that said field links said inductor element to an extent dependent upon the tilt of the axis of said rotor from the vertical, one of said elements being non-rotatable about the axis of said rotor and pendulously and universally supported with respect to said gyroscope, means for supporting and rotating the other of said elements about the axis of said rotor in the same direction as and at a speed related to and controlled by said rotor, whereby the magnetic torque developed between said elements upon the tilt of said rotor axis is applied to said rotor as a procession torque in a plane substantially normal to the vertical plane including a tilted rotor axis to restore the axis to the vertical, and means for damping the movement of said pendulously-supported element to prevent spiralling thereof.

9. An electromagnetic gyro-erecting system comprising a gyroscope having a rotor normally rotatable about a vertical axis, an inductor element, an element for producing a magnetic field, said elements being relatively disposed so that said field links said inductor element to an extent dependent upon the tilt of the axis of said rotor from the vertical, one of said elements being nonrotatable about the axis of said rotor and pendulously and universally supported with respect to said gyroscope, means for supporting and rotating the other of said elements about the axis of said rotor in the same direction as and at a speed related to and controlled by said rotor, whereby the magnetic torque developed between said elements upon the tilt of said rotor axis is applied to said rotor as a precession torque in a plane substantially normal to the vertical plane including the tilted rotor axis to restore the axis to the vertical, and means for intermittently braking said pendulously-supported element to prevent spiralling thereof.

10. An electromagnetic gyro-erecting system comprising a gyroscope having a rotor normally rotatable about a vertical axis, an inductor element, an element for producing a magnetic field, said elements being relatively disposed so that said field links said inductor element to an extent dependent upon the tilt of the axis of said rotor from the vertical, one of said elements being nonrotatable about the axis of said rotor and pendulously and universally supported with respect to said gyroscope, means for supporting and rotating the other of said elements about the axis of said rotor in the same direction as and at a speed related to and controlled by said rotor, whereby the magnetic torque developed between said elements upon the tilt of said rotor axis is applied to said rotor as a precession torque in a plane substantially normal to the vertical plane including the tilted rotor axis to restore the axis to the vertical, and a damping fluid bath surrounding said pendulously-supported element to prevent spiralling thereof.

11. An electromagnetic gyro-erecting system comprising a gyroscope having a rotor normally rotatable about a vertical axis, an inductor element, an element for producing a magnetic field, said elements being relatively disposed so that said field links said inductor element to an extent dependent upon the tilt of the axis of said rotor from the vertical, one of said elements being non-rotatable about the axis of said rotor and pendulously and universally supported with respect to said gyroscope, means for supporting and rotating the other of said elements about the axis of said rotor in the same direction as and at a speed related to and controlled by said rotor, the support of said elements being such that the magnetic torque developed between said elements upon the tilt of said rotor axis is applied to said rotor as a precession torque, and means controlling the reactance in the circuit of said coil to determine the phase relation between the plane in which said precession torque is applied and the vertical plane including the tilted rotor axis to restore the axis to the vertical.

12. A magnetic gyro-erecting system comprising a gyroscope having a rotor including an element for producing a magnetic field, and armature member nonrotatable about the axis of said rotor and forming with said element the driving motor for said gyroscope, an inductor element disposed in relation to said field element so that the field thereof links said inductor element to an extent dependent upon the tilt of the axis of said rotor from the vertical, said inductor element being nonrotatable about the axis of said rotor and pendulously and universally supported with respect to said gyroscope, the magnetic torque developed between said elements upon the tilt of said rotor axis is applied to said rotor as a precession torque in a plane substantially normal to the vertical plane including the tilted rotor axis to restore the axis to the vertical.

13. An electromagnetic gyro-erecting system comprising a gyroscope having a rotor normally rotatable about a vertical axis, an inductor element, an element for producing a magnetic field, said elements being relatively disposed so that said field links said inductor element to an extent dependent upon the tilt of the axis of said rotor from the vertical, one of said elements being nonrotatable about the axis of said rotor and pendulously and universally supported with respect to said gyroscope, means for supporting and rotating the other of said elements about the axis of said rotor in the same direction as and at a speed related to and controlled by said rotor, the support of said elements being such that the magnetic torque developed between said elements upon the tilt of said rotor axis is applied to said rotor as a precession torque, and means for tuning said inductor element to form a capacitive circuit, whereby the plane in which said precession torque is applied is substantially in quadrature with the vertical plane including the tilted rotor axis and is effective to restore the axis to the vertical.

HERBERT C. ROTERS.